United States Patent
Balthes et al.

(10) Patent No.: US 9,517,730 B2
(45) Date of Patent: Dec. 13, 2016

(54) PANEL SHELF SYSTEM

(71) Applicant: TEKMODO LLC, Elkhart, IN (US)

(72) Inventors: Garry Balthes, Elkhart, IN (US); Mary Wetzel, Mishawaka, IN (US); Marc Lacounte, Goshen, IN (US); Brian Charles Evans, Marshfield, MA (US)

(73) Assignee: Tekmodo, LLC, Elkhart, IN (US)

( * ) Notice: Subject to any disclaimer, the term of this patent is extended or adjusted under 35 U.S.C. 154(b) by 368 days.

(21) Appl. No.: 13/859,416

(22) Filed: Apr. 9, 2013

(65) Prior Publication Data

US 2014/0061272 A1    Mar. 6, 2014

Related U.S. Application Data

(60) Provisional application No. 61/622,055, filed on Apr. 10, 2012.

(51) Int. Cl.
| | |
|---|---|
| B60R 7/00 | (2006.01) |
| A47F 7/08 | (2006.01) |
| A47F 5/08 | (2006.01) |
| A47G 29/087 | (2006.01) |
| D06F 53/00 | (2006.01) |
| A47B 96/06 | (2006.01) |
| B60R 11/00 | (2006.01) |
| B60P 3/14 | (2006.01) |

(52) U.S. Cl.
CPC . B60R 11/00 (2013.01); B60P 3/14 (2013.01)

(58) Field of Classification Search
CPC ................................. B60R 11/00; B60P 3/14
USPC .. 224/543; 211/36, 90.1, 119.003; 248/213.1
See application file for complete search history.

(56) References Cited

U.S. PATENT DOCUMENTS

| | | | | |
|---|---|---|---|---|
| 3,897,971 A | * | 8/1975 | Evans | 296/24.44 |
| 3,911,832 A | * | 10/1975 | Vandergriff | 105/372 |
| 4,094,546 A | * | 6/1978 | Glassmeyer et al. | 296/24.4 |
| 4,281,870 A | * | 8/1981 | Ehrlich et al. | 296/24.44 |
| 5,042,863 A | * | 8/1991 | Fraga | 296/24.44 |
| 5,375,534 A | * | 12/1994 | Adams | 105/372 |
| 6,634,727 B2 | * | 10/2003 | Torres | 312/321.5 |
| 6,854,400 B2 | * | 2/2005 | Sullivan | 105/372 |
| 6,935,605 B2 | * | 8/2005 | Giles et al. | 248/221.11 |
| 7,370,899 B2 | * | 5/2008 | Powers et al. | 296/24.4 |
| 2003/0107305 A1 | * | 6/2003 | Kusztal et al. | 312/223.3 |
| 2006/0180623 A1 | * | 8/2006 | Reynolds et al. | 224/542 |

(Continued)

*Primary Examiner* — Brian D Nash
*Assistant Examiner* — Derek Battisti
(74) *Attorney, Agent, or Firm* — Barnes & Thornburg LLP

(57) ABSTRACT

A load panel shelf assembly includes a shelf frame, at least one panel, a mounting rail, and a hinge assembly. The shelf frame is composed of a plurality of frame segments. The at least one panel is fitted within the shelf frame to form a shelf surface. The mounting rail is configured to attach to a sidewall of a transport vehicle and includes a shelf support configured to support a portion of the shelf frame. The mounting rail includes a mounting rail receiver and the at least one of the frame segments includes a frame segment receiver. The hinge assembly includes first and second hinge segments which are pivotally connectable by a pivot pin disposed through both the first and second hinge segments. The first hinge segment and the second hinge segment each have a cross-section profile that is configured to fit into the cross-section profiles of the mounting rail receiver and the frame segment receiver, respectively.

4 Claims, 3 Drawing Sheets

(56) References Cited

U.S. PATENT DOCUMENTS

2008/0012372 A1* 1/2008 Squyres et al. ............ 296/24.44

* cited by examiner

PANEL SHELF SYSTEM

RELATED APPLICATIONS

The present application relates to and claims priority to U.S. Provisional Patent Application Ser. No. 61/622,055, filed on Apr. 10, 2012, entitled "Truck Load Panel for Package/Parcel Distribution Vehicles." The subject matter disclosed in that provisional patent application is hereby expressly incorporated into the present application by reference.

TECHNICAL FIELD AND SUMMARY

The following disclosure relates to cargo and delivery vehicles, and more particularly to cargo area shelf panels that are movable between stowed and use positions.

The shelves of the present disclosure are configured to be installed in the cargo areas of package/parcel distribution vehicles or cargo trucks. They may be installed on the sidewalls of the cargo area illustratively midway up and can be moved from a use position which extends out from the cargo area wall or pivoted up against and generally parallel to the wall at a stowed position. When the shelf is in the use position, packages may be loaded in the vehicle under the shelf and also loaded on top of the shelf. Because truck cargo areas can be relatively large (e.g. about 11 feet high), the shelf of this disclosure is strong enough to support substantial weight and impact forces when in its use position. The shelf may also be strong enough to be walked on by persons loading the truck, as well as support the weight of the cargo itself. And since the vehicle will be moving, the shelves will be subjected to impact from the cargo when moving around. Rivets or other fasteners attach a shelf mounting rail to the wall.

Because of the stress these shelves endure on a daily basis, it is anticipated that the shelf of the present disclosure may need to be replaced and/or repaired from time to time. One embodiment includes a hinge feature that may quickly attach and detach the shelf assembly from the mounting rail which can be useful.

An illustrative shelf assembly of the present disclosure includes: high impact resilient skins illustratively about 0.15" thick made from a thermoplastic material reinforced with continuous by-directional glass fibers; a polyurethane foam core that is injected into a shelf frame to fill space between upper and lower skins (the foam core may also bond to the skins and frame)—alternatively, a polypropylene honeycomb core may fill the space between frames and be bonded to the skins (the honeycomb core may be glued to the frame); extruded aluminum frame that provides perimeter strength and stiffness to the overall panel assembly—the frame receives and retains the skins, receives components used to provide a pivot/hinge for the panel assembly, receives a corner locking illustrative "L" shaped element configured to interference fit between adjoining frame segments coupling the frame segments together; an extruded mounting rail configured for a truck trailer or delivery vehicle cargo area, including a receiver configured to receive a portion of a hinge and a support to relieve load from the hinge, the hinge illustratively made from aluminum in segment blanks; a modular pivot hinge assembly configured to fit in the receiver of the mounting rail by sliding the hinge onto the rail and has a profile that mates with the profile of the mounting rail and slidable into the receiver of the mounting rail—the hinge may include a lock feature such as a locking screw to engage the mounting rail or shelf frame and secures the hinge in place at any desired location along the rail or shelf frame, illustratively removes and replaces the hinge without using power tools; frame corner locking elements configured to couple frame segments of the shelf assembly together by interference fit without the need to weld the frame segments together; and a sprayed-on or glued-on anti-skid surface to be applied on the outward facing portion of the skin.

Another illustrative embodiment of the present disclosure provides a load panel shelf assembly attachable on a side wall of a vehicle cargo area. The load panel shelf assembly includes a shelf frame, at least one panel, a mounting rail, and a hinge assembly. The shelf frame is composed of a plurality of frame segments. The at least one panel is fitted within the shelf frame to form a shelf surface. The mounting rail is configured to attach to a sidewall of a transport vehicle and includes a shelf support configured to support a portion of the shelf frame. The mounting rail includes a mounting rail receiver and the at least one of the frame segments includes a frame segment receiver. The mounting rail receiver and the frame segment receiver have substantially similar cross-sectional profiles. The hinge assembly includes first and second hinge segments which are pivotally connectable by a pivot pin disposed through both the first and second hinge segments. The first hinge segment and the second hinge segment each have a cross-section profile that is configured to fit into the cross-section profiles of the mounting rail receiver and the frame segment receiver, respectively.

In the above and other embodiments, the load panel shelf assembly may further comprise: a foam core located within the shelf frame; all of the plurality of frame segments have identical cross-sectional profiles; and the first and the second hinge segments being identical.

Additional features and advantages of the shelf assembly will become apparent to those skilled in the art upon consideration of the following detailed descriptions exemplifying the best mode of carrying out the shelf assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the shelf assembly and such exemplification is not to be construed as limiting the scope of the shelf assembly in any manner.

DETAILED DESCRIPTION OF THE DRAWINGS

Figure 1:
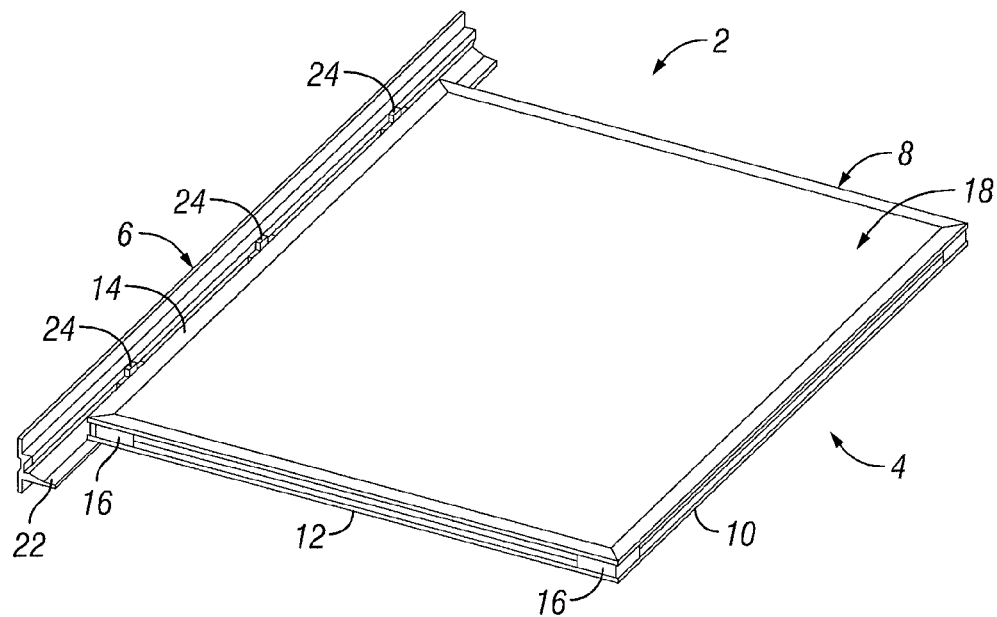
FIG. 1 is a perspective view of an illustrative embodiment of a shelf assembly.

The perspective view of shelf assembly 2 is shown in FIG. 1. Shelf assembly 2 includes a shelf 4 and a mounting rail 6. Shelf assembly 4 includes frame segments 8, 10, 12, and 14 that form the illustrative periphery of shelf 4. Frame segment connectors 16 may be illustratively "L" shaped and configured to be located at the corner of each frame segment and connect adjoining frame segments together. A top panel skin 18 is illustratively located within frame segments 8, 10, 12, and 14. Mounting rail 6 is shown including an extending support segment 22 configured to support shelf 4 when in the use position as shown. Hinge assemblies 24 are shown coupled between shelf 4 and mounting rail 6. As discussed further herein, hinge assembly 24 is configured to pivot shelf 4 with respect to mounting rail 6 between use and stowed positions. It is appreciated that a plurality of hinges 24 may be employed to movably couple shelf 4 to mounting rail 6. It is further appreciated that the width of hinge 24 may be widen or narrowed depending on the particular use requirements of shelf assembly 2.

Figure 2:
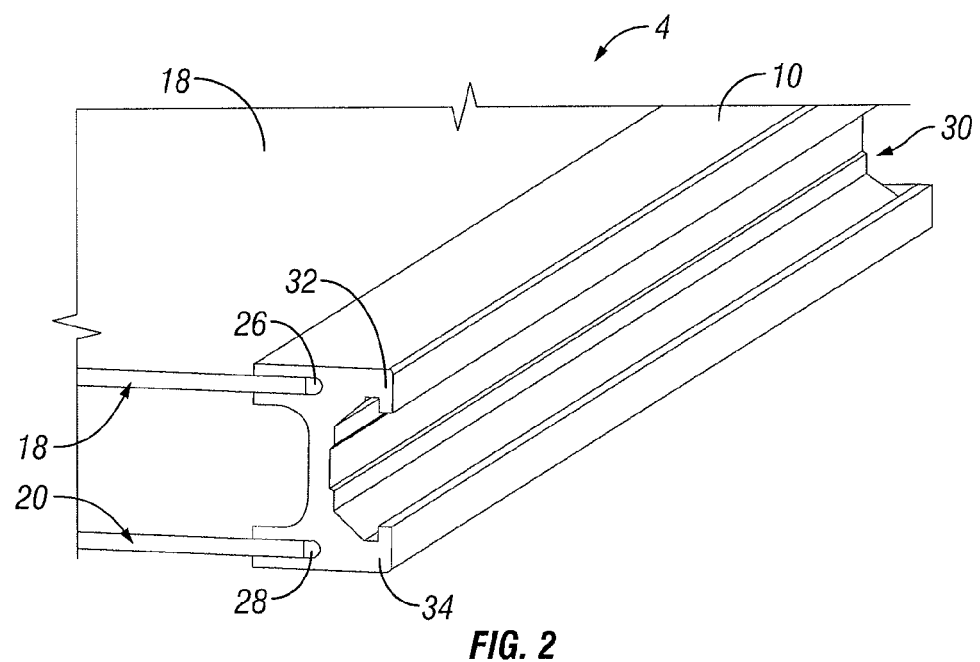
FIG. 2 is a perspective detail view of a portion of the shelf portion of the shelf assembly.

A perspective partial cross-section detail view of shelf 4 is shown in FIG. 2. This view includes a portion of frame segment 10 along with skins 18 and 20 fitted into slots 26 and 28, respectively. It is appreciated that although frame segment 10 is shown, the same slots 26 and 28 may be included in segments 8, 12, and 14 as well. This creates modularity, so illustratively each of frame segments 8, 10, 12, and 14 may be identically shaped and each can be used as any frame segment for shelf 4. Also shown in this view is receiver 30 formed in frame segment 10. As will be appreciated when discussed further herein, receiver 30 has a cross-sectional profile complimentary to the profile of a portion of hinge 24. Illustratively, hinge 24 may be slid as the male segment into receiver 30 as the female segment. In this illustrative embodiment, tabs 32 and 34 keep hinge 14 from pulling out of receiver 30. Illustratively, hinge 24 couples to shelf 4, either before frame segment connector 16 is attached, or connector 16 may be removed to expose receiver 30. Hinge 14 may then be slid onto receiver 30 and connector 14 replaced onto the corner of adjoining frame segments.

Figure 3:
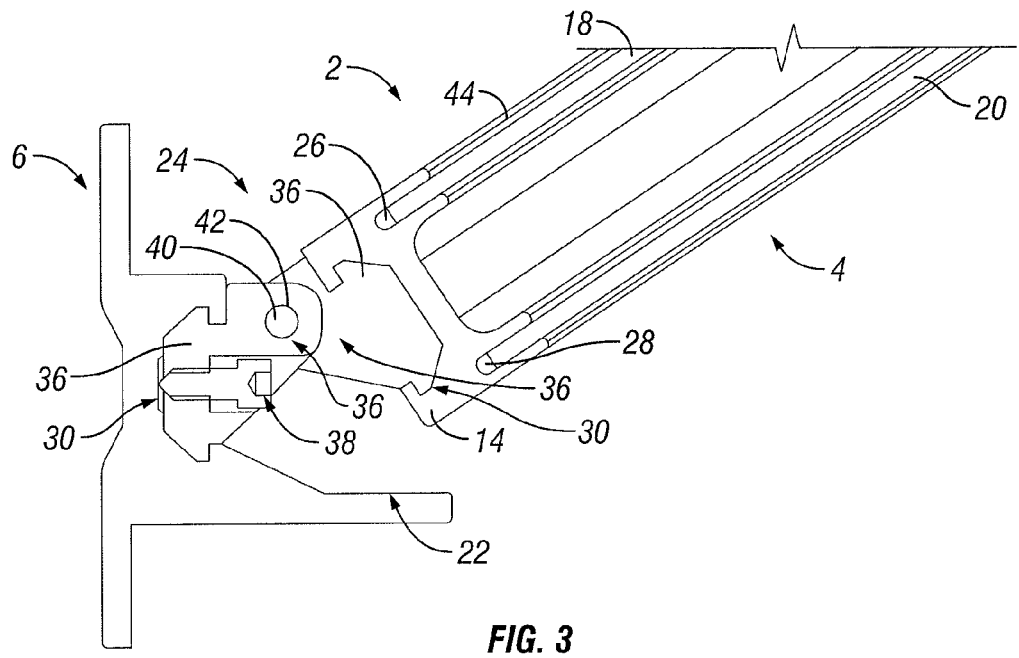
FIG. 3 is a side cross-sectional view of the shelf assembly including a hinge attached to a mounting rail and shelf portion.

A side detail cross-sectional view of shelf assembly 2 is shown in FIG. 3. This view shows how hinge 24 pivotably couples shelf 4 to mounting rail 6. In this illustrative embodiment, hinge 24 is composed of two modular hinge components 36 because the two hinge components 36 are illustratively the same. It reduces manufacturing cost, as well as potential error for assembly or repair. Each hinge component 36 includes a bore that receives a locking screw 38 to engage either mounting rail 6 or frame component 14. The cross-sectional profile of hinge components 36 correspond to the profile of receivers 30 of mounting rail 6 and frame component 14. A pivot pin 40 extends through a bore 42 from hinge component 36 to create the pivot between adjoining hinge component 36. Also shown in this view is support segment 22 configured to support shelf 4 when in the use position. Skins 18 and 20 are shown fitted in slots 26 and 28. In an illustrative embodiment an anti-skid top surface 44 may be applied to skin 18 to provide additional traction to the top surface of shelf 4.

Figure 4:
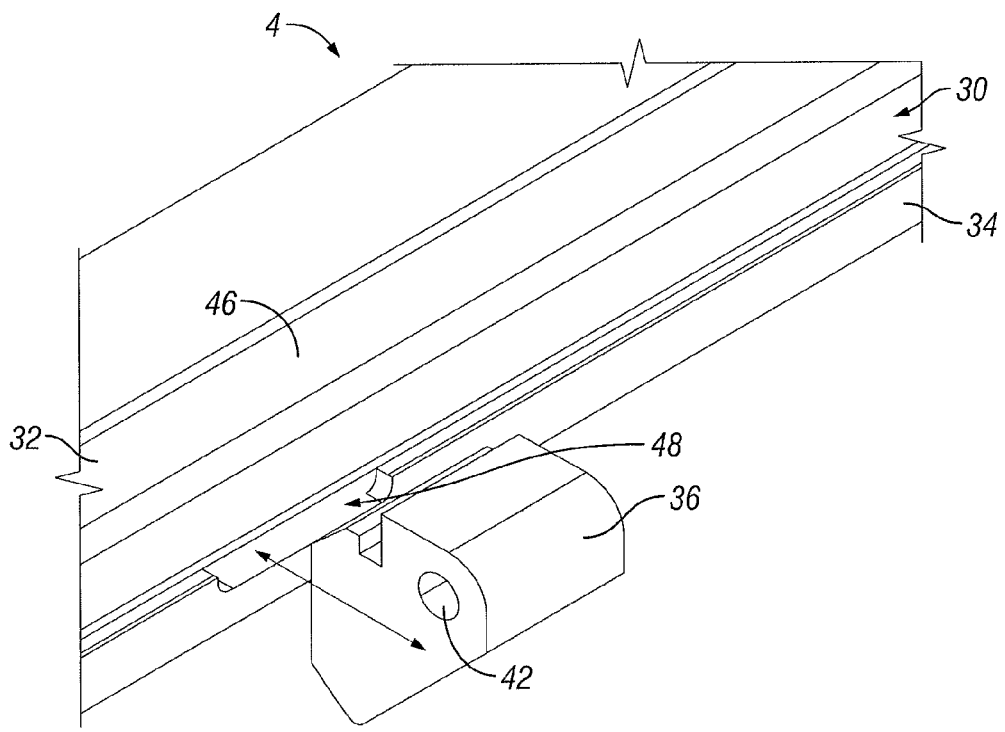
FIG. 4 is a perspective detail view of a portion of a frame segment and a hinge segment from the shelf assembly shown in FIG. 1.

An illustrative feature of shelf 4 is shown in the partially exploded perspective detail view of FIG. 4. As this view depicts, receiver 30 may include notched sections 46 and 48 formed in tabs 32 and 34, respectively. This allows hinge component 36 to be removed from receiver 30 without having to slide it all the way down to the end of the frame component and remove connector 16.

Figure 5:
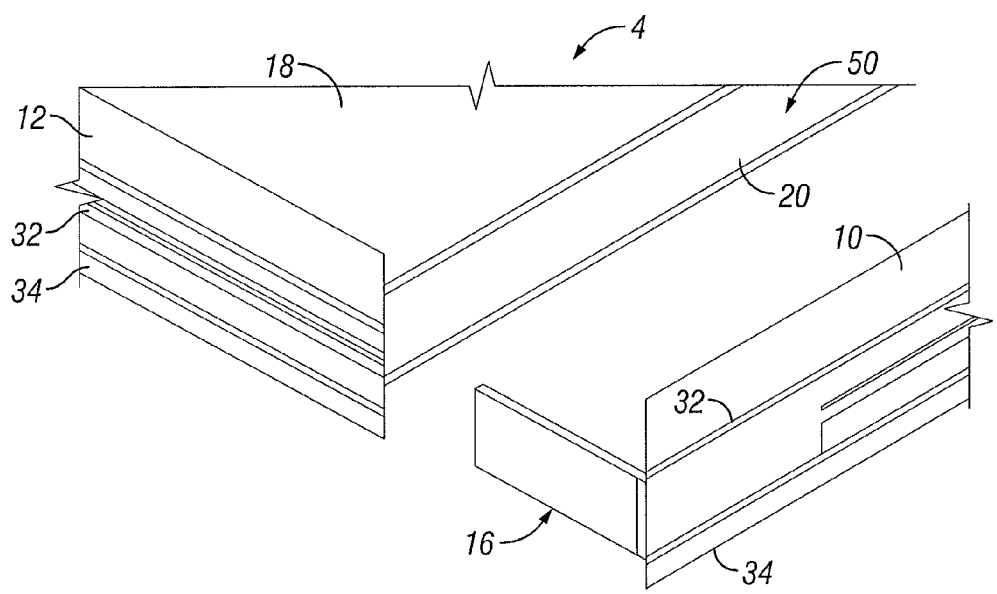
FIG. 5 is a partially exploded detail perspective view of a shelf portion of the shelf assembly that includes frame segments and a rocking element.

A perspective partially exploded detail view of shelf 4 is shown in FIG. 5. This view demonstrates how connectors 16 couple adjoining frame segments 10 and 12 together. With frame segment connectors 16 being "L" shaped, they can slide within tabs 32 and 34 of receiver 30 at each corner of the frame segments. This holds the frame segments together. This view also shows skins 18 and 20. It is appreciated that the space 50 located between skins 18 and 20 may be filled with foam, a honeycomb core, or similar filler.

Figure 6:
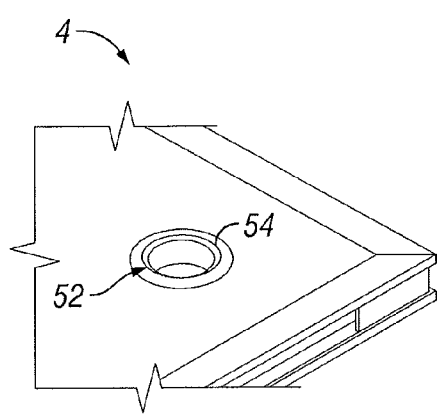
FIG. 6 is a detail perspective of a portion of the frame portion of the frame assembly.
Figure 7:
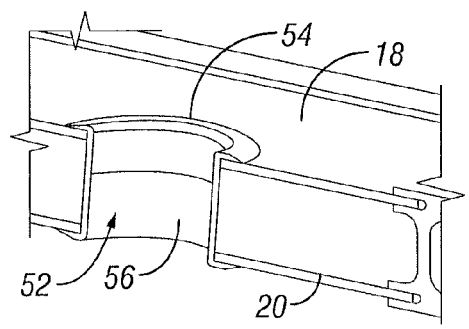
FIG. 7 is a cross-sectional view of a portion of the shelf portion of the frame assembly.

A perspective view of a portion of shelf 4 which includes a lift opening 52 is shown in FIG. 6. Opening 52 is illustratively disposed through the thickness of shelf 4 to provide a grasping location for an operator to lift or lower shelf 4. The cross-sectional detail view in FIG. 7 shows grommet components 54 and 56 fixed at the periphery of opening 52.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A load panel shelf assembly attachable on a side wall of a vehicle cargo area, the load panel shelf assembly comprising:
   a shelf frame composed of a plurality of frame segments;
   a mounting rail configured to attach to a sidewall of a transport vehicle;
   wherein the mounting rail includes a shelf support configured to support a portion of the shelf frame;
   wherein the mounting rail includes a first hinge segment receiver;
   wherein at least one of the frame segments includes a second hinge segment receiver;
   wherein the first hinge segment receiver and the second hinge segment receiver have substantially similar cross-sectional profiles;
   a hinge assembly including a first hinge segment and a second hinge segment;
   wherein the first hinge segment is pivotable with respect to the second hinge segment by a pivot pin disposed through both the first hinge segment and the second hinge segment;
   wherein the first hinge segment and the second hinge segment are substantially identical, and each has a cross-section profile that is configured to fit into the cross-section profile of the first hinge segment receiver and the second hinge segment receiver, when the first hinge segment is positioned reverse with respect to the second hinge segment.

2. The load panel shelf assembly of claim 1, further comprising a foam core located within the shelf frame.

3. The load panel shelf assembly of claim 1, wherein all of the plurality of frame segments have identical cross-sectional profiles.

4. The load panel shelf assembly of claim 1, wherein the first and the second hinge segments are identical.

* * * * *